UNITED STATES PATENT OFFICE.

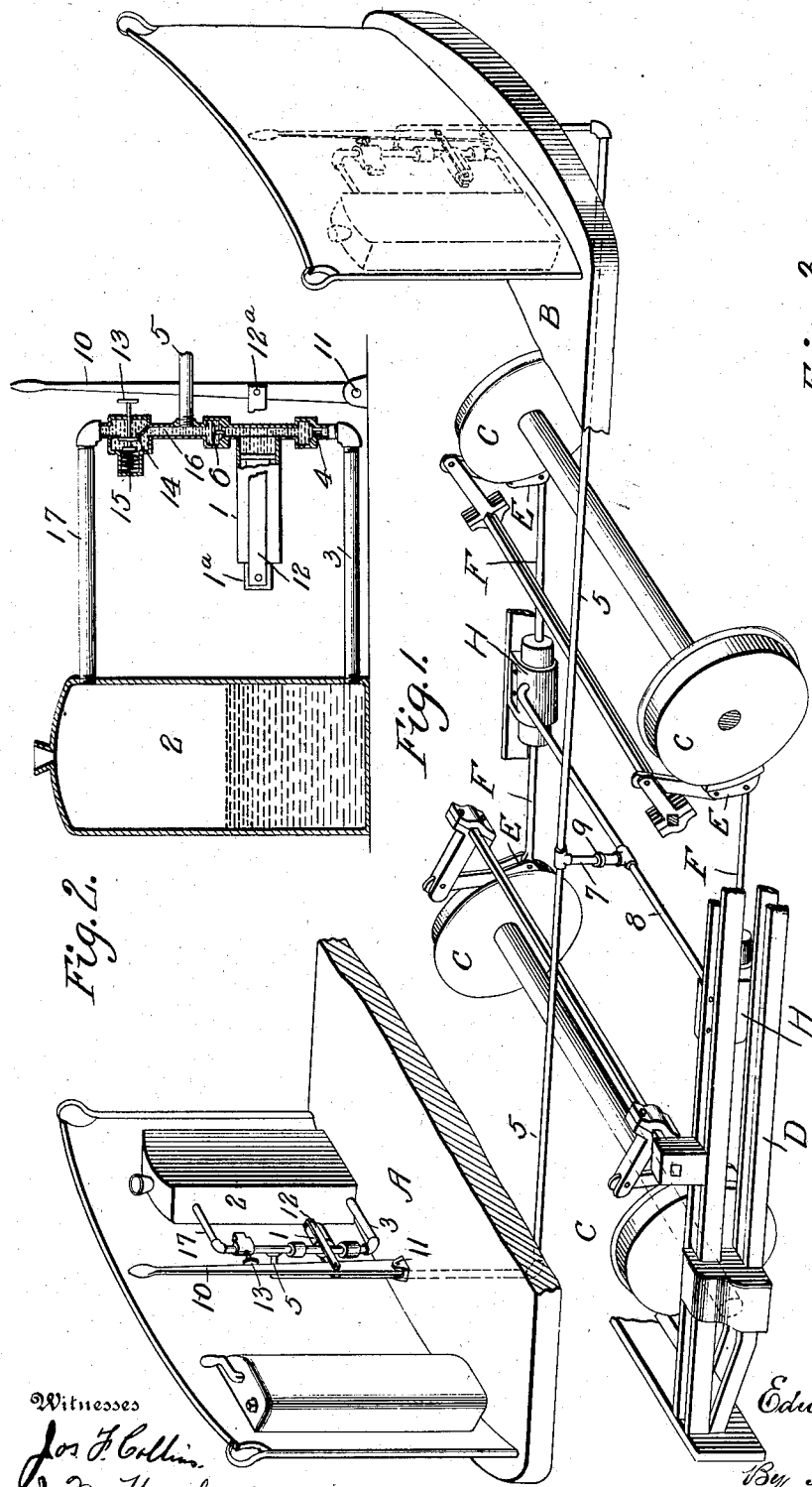
E. A. BARBER.
HAND BRAKE FOR RAILWAY CARS.
APPLICATION FILED APR. 18, 1908.
911,285. Patented Feb. 2, 1909.

EDWARD A. BARBER, OF WATERTOWN, NEW YORK.

HAND-BRAKE FOR RAILWAY-CARS.

No. 911,285.

Specification of Letters Patent.

Patented Feb. 2, 1909.

Application filed April 18, 1908. Serial No. 427,845.

*To all whom it may concern:*

Be it known that I, EDWARD A. BARBER, a citizen of the United States, residing at Watertown, in the county of Jefferson and State of New York, have invented certain new and useful Improvements in Hand-Brakes for Railway-Cars, of which the following is a specification.

My invention, while capable of general application to railway cars, is designed primarily for use upon street cars, and for this reason the system is preferably operated by a hand lever, although it would not be beyond the purview of my invention to have the lever or the pump which it controls suitably operated by an electric motor or other prime mover.

The object of my invention is to secure the flexibility of a fluid pressure brake system with the directness of application and control of a mechanical brake system without the complication of controlling mechanism required by the air pressure system, or the complication of mechanical parts with all the wear and tear incident thereto that is necessarily encountered in a purely mechanical system.

According to my invention, I utilize a substantially inelastic liquid in a manner to transmit power directly from a pressure developing means to the pressure utilizing and brake applying means, in such a manner that movement of the pressure developing means is transmitted directly to the piston which applies the brake and then release and return it to the pressure developing point, or preferably to a reservoir or container where it is kept free from pressure. The system thus permits the constant use of the same pressure transmitting medium without material waste. In carrying out my invention, I prefer an arrangement wherein the operating lever is adapted to release and permit return flow of the pressure applying fluid; also a single conduit or pipe for both the application and return flow of the pressure medium; also a duplication of the pressure developing means at oposite ends of the car, with conduits leading therefrom to the common brake applying means.

My invention will be understood upon reference to the accompanying drawing, in which, Figure 1 is a perspective view of those parts of a street railway car of known construction, which are immediately concerned with my present invention; Fig. 2 is a detail view on an enlarged scale, of the pressure developing and releasing means; and Fig. 3 is a detail view, on an enlarged scale, of an illustrative form of pressure receiving and brake applying means.

A and B represent the platforms of a vehicle, which require a braking apparatus, as, for instance, a street railway car, which is selected for the purpose of illustrating my invention but to which the application of invention is by no means limited.

C represents the wheels which are to be understood as being suitably mounted in a truck frame, a portion of which is illustrated at D, and E are brakes mounted in suitable braking relation to the wheels, and the application and release of which is to be accomplished by my invention.

The truck and brakes selected for illustration are constructed substantially as set forth in previous Letters Patent Nos. 878,179 and 878,181, issued to me February 4, 1908, the brake comprising suitable shoes, which are directly connected to piston rods F extending from pistons G and cylinders H, all mounted in alinement with the direction of pressure to be applied to the brake shoes, said pistons being also provided with releasing springs K.

My invention is designed to introduce pressure between the pistons G in the cylinders H and to relieve such pressure therefrom at the will of the motorman and to apply said pressure through a medium which virtually effects a brake pressure from the pressure developing means to the pistons with the inelasticity and directness of control of mechanical means, yet with the flexibility and directness of application, and without the complexibility of control incident to the use of air. These objects are attained by providing a pump 1 adapted to draw a liquid from any suitable source, as for instance a reservoir 2, through pipe 3 and past a check valve 4, and to force it out through a pipe 5 to the brake cylinders, said pipe 5 being connected with the cylinders through such branch pipes as circumstances may require, and being guarded by a check valve 6, preferably located near the pump 1. For purposes of illustration, I have shown the pipe 5 connected through a vertical lead 7 with a cross pipe 8 that connects it with both cylinders H, and in order to compensate for relative vertical movement between the car body and the truck, I have introduced a telescopic slip joint 9 in the vertical lead 7. But this arrangement of device may be modified at will to suit conditions to be met with in practice, and any other means of maintaining continuity of the conduit while permitting freedom of relative movement between the body and truck may be employed.

Pump 1 may be conveniently operated by hand through the medium of a lever 10, fulcrumed at 11, and having a link or links 12 connecting it with the plunger $1^a$ of the pump. As the lever 10 is pressed a limited distance toward the pump, it will draw in liquid from reservoir 2, past the check valve 4, and as the lever is moved in the opposite direction, the pump piston will seat the check valve 4 and displace the liquid past the check valve 6 into the pipe 5. As the conduit system, as well as the space between the pistons G in cylinders H, is kept filled with the liquid at all times, it requires little application of movement to develop the necessary pressure against the pistons G and to spread them so that the brake shoes which they control will exert the required pressure against the wheels; moreover, when the brake shoes are against the wheels, the pressure applied to pistons G is directly proportional to the pull upon the lever 10, the total work being thus exerted being obviously dependent upon the relation of the whole length of the lever 10 to the distance between its fulcrum 11 and the link pivot $12^a$, and also proportional to the area of the pump head of the plunger $1^a$ and the area of the pistons G. From this, it will be seen that while it may require several oscillations of lever 10 to drive the pistons G apart, when their connected brake shoes are once seated against the wheels, the pressure that can be exerted thereon by the motorman throwing his weight upon the lever 10 will be very great. The brakes may be incidentally released by moving the lever 10 forward a distance beyond its normal pumping throw until it impinges the stem 13 of a check valve 14 that is held normally closed by a spring 15 in the same direction as that in which the braking pressure acts upon it. When valve 14 is unseated by the full throw of lever 10, the braking liquid may return through the pipe 5, and while pressing check valve 6 to its seat may flow upward through the pipe 16 past check valve 14 and through pipe 17 to the reservoir 2; this return movement of the liquid being caused by the resiliency in the brakes, developed in the present illustrative construction by the springs K.

I prefer to use water as the liquid through which to operate my brake system, because of its relatively small coefficient of inelasticity, but other liquids may be employed with measurable success. In installing the brake system in places where freezing temperature is encountered, the water is mixed with an anti-freezing liquid which may be economically used in consequence of the fact that the liquid is used over and over again and not consumed in the operation of the system.

The pressure developing means is duplicated on opposite ends of the car so as to be ready for use at either end. The pipes 5 leading to the respective ends are directly connected to the brakes without obstruction between them. The presence of either pressure developing and controlling means does not detract from the operativeness of the other, since it will be seen that pressure transmitted through the pipe 5 to the end of the car opposite to that from which the brakes are being operated, will simply be checked in pipe 16 by the valves 6 and 14, and as the level of the liquid is not materially lowered in the pipe 16, there is no loss of pressure.

I desire it understood that I do not limit myself to the precise details of construction herein disclosed in illustrating my invention, as these may be changed without departing from the spirit of my invention.

Having thus described my invention, what I claim as new therein and desire to secure by Letters Patent is:—

1. In a brake system, the combination of a brake cylinder, a liquid conduit communicating with the pressure space therein, a liquid reservoir, a pump drawing liquid from the reservoir and discharging it into the conduit, check valves located between the pump and the reservoir and between the pump and conduit respectively, a return passage between the conduit and the reservoir, and a check valve in said return passage, normally closed against back pressure in the conduit; said pump being provided with an operating lever, and said operating lever being adapted to unseat the check valve in the return passage, by an abnormal range of movement.

2. In a liquid-pressure brake-system, the combination of pressure-utilizing and brake-applying means, a liquid pumping and forcing means having connection with the liquid-pressure utilizing, and brake-applying means and developing the braking pressure therein, an operating handle for the liquid pumping and forcing means, and a pressure releasing means located in the path of movement of said operating handle and adapted to be released by an abnormal movement of the latter.

The foregoing specification signed at Watertown N. Y. this 2d day of April, 1908.

EDWARD A. BARBER.

In presence of two witnesses—
 A. H. LEFEBORE,
 DELOS M. COSGROVE.